3,639,497
EXTRACTION AND MULTI-STAGE FRACTIONAL DISTILLATION WITH INDIRECT HEAT EXCHANGE OF LIQUID AND VAPOR PROCESS AND SYSTEM FOR RECOVERING AROMATIC PRODUCTS
Eugene H. Martel, Bromley, Kent, and Gerald T. Schuch, Surrey, England, assignors to The Badger Company, Inc., Cambridge, Mass.
Filed Aug. 22, 1968, Ser. No. 754,625
Int. Cl. B01d 3/00
U.S. Cl. 260—674 SE                6 Claims

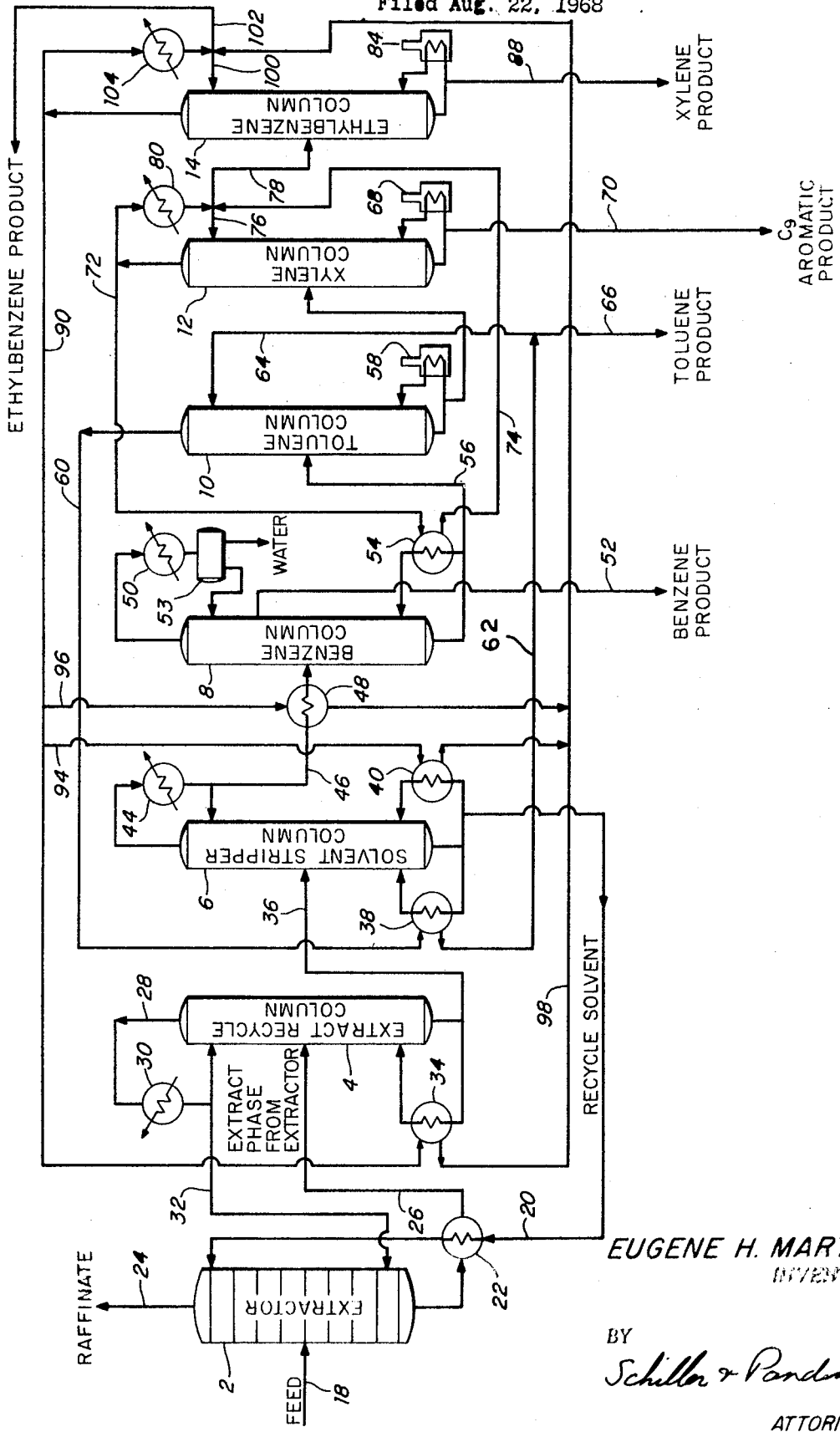

ABSTRACT OF THE DISCLOSURE

A system for recovering high purity aromatic products from mixed hydrocarbon feedstocks comprising an aromatic extraction unit and an aromatics fractionation unit integrated by heat exchange whereby substantial savings in operating costs are realized. The aromatics are extracted from the feedstocks by means of a selected solvent and the resulting extract is stripped to produce an aromatic-rich stream which, in turn, is fractionated into specification aromatic products. The basis of the integrated system is utilization of the overhead vapors from the aromatic fractionation towers as a source of reboil heat in the extraction unit.

---

This invention relates to the extraction and fractionation of aromatics and more particularly to a system and low-cost method for recovering high-purity aromatics from feedstocks comprising a mixture of aromatic and non-aromatic hydrocarbons.

With the growing demand of high-purity aromatic products for the chemical industry, certain petroleum derivates such as reformates and hydrogenated pyrolysis gasolines have become the major source of raw materials for the production of a wide variety of aromatic compounds, including but not limited to ethylbenzene, toluene, benzene, xylene isomers and $C_9$ aromatics. Non-aromatic hydrocarbons also are recovered from the processing of such raw materials. Compared to the aromatic-rich crude stocks obtained fom the coking of coal, these petroleum hydrocarbon mixtures contain a low concentration of aromatics whose sharp separation from the non-aromatics is not possible by simple distillation. Instead separation is achieved by liquid-liquid extraction followed by a series of fractional distillations. The extracting agent is a selected organic solvent which forms two phases with the feedstock mixture. Typically, the feedstock is charged to the middle of an extraction tower while the solvent is fed to the top of the tower and travels downward, thereby preferentially dissolving the aromatics. The extract phase (the solvent loaded with aromatics) is recovered from the bottom of the extractor while the raffinate phase (the undissolved non-aromatics, olefins, etc.) is recovered overhead. The extract phase is treated to recover the solvent which is returned to the extraction unit and the resulting mixture of aromatics is then distilled to effect separation and recovery of high-purity aromatic products. The non-aromatics are recovered separately with a purity suitable for commercial use. However, with this type of process utility costs are high as large quantities of heat are required to effect the necessary separations of the extract phase. When the fractionation scheme includes an ethylbenzene-xylene distillation, the heat requirements are further increased, due to the high reflux ratio (in the order of 100:1) associated with this separation.

Accordingly, the principal object of the present invention is to provide an aromatic extraction/fractionation system and method which is characterized by substantially lower utility requirements than systems and methods heretofore used in the art for similar purposes.

A further object is to provide a relatively inexpensive and efficient method of producing high-purity aromatic products from low-grade hydrocarbon feedstocks.

Yet another object is to provide an integrated aromatic extraction/fractionation system which offers the advantage of substantial savings in capital equipment costs as well as operating costs.

Essentially the foregoing objects are attained by providing an aromatics extraction/fractionation system which is integrated by heat exchange between the overhead vapors of the aromatic fractionation towers and the extraction unit. In the preferred embodiment of the invention hereinafter described overhead vapors from one or more of the distillation columns in the fractionating unit are utilized as a source of reboil heat for stripping the columns in the extraction unit. Further objects and advantages of the invention are set forth or rendered apparent by the following detailed specification which is to be considered together with the accompanying drawing which is a schematic diagram of an intergrated extraction-distillation system for recovering benzene, toluene, xylene, ethylbenzene and $C_9$ aromatic isomers as high purity products from a mixed aromatic-nonaromatic hydrocarbon feedstock.

In the practice of this invention any one of a variety of aromatics extraction units may be integrated with a fractional distillation unit to effect separation and recovery of the aromatic and non-aromatic constituents of a mixed hydrocarbon feedstock. Moreover, various mixed hydrocarbons feedstocks may be treated according to this invention. By way of example but not limitation, the invention may be practiced with extraction units utilizing the Udex process of Dow Chemical Co., the Sulfolane process of Shell Oil Company, the Arosolvan process of Lurgi Gesellschaft fur Mineralotechnic mbH, or the DMSO process of Institut Francaise du Petrol. The solvents used by these or other extraction processes include diethylene glycol, mixtures of diethylene glycol and dipropylene or triethylene glycol, N-methylpyrrolidone and water, N-methylpyrrolidone and ethylene glycol, and $SO_2$ among others.

Turning now to the drawing, the illustrated system comprises an extraction section and a refractionation section. The extraction section includes an extractor unit 2, an extract recycle column 4, and a solvent stripper column 6. The refractionation section includes a benzene distillation of column 8, a toluene distillation column 10, a xylene distillation column 12 and an ethylbenzene distillation column 14. Preferably, but not necessarily, the extractor unit 2 is of the mixer-settler type involving countercurrent flow of a selected solvent and a selected hydrocarbon feedstock. The latter comprising a mixture of aromatic and non-aromatic hydrocarbons, is introduced into the extractor unit via a line 18. The selected solvent, which is continuously recovered from the extract phase in the stripper column 6, is introduced into the top end of the extactor unit, via a line 20 and a heat exchanger 22. Within the extractor unit, the solvent travels downward and dissolves the aromatics and part of the low-boiling aromatics of the feedstock. The raffinate, comprised of the non-aromatics in the feed plus any excess aromatics not extracted by the solvent, leaves the top of the extractor via a line 24. The raffinate contains a little solvent which may be removed by passing the raffinate through a water scrubber (not shown). The solvent-bearing wash water from the raffinate scrubber may be recharged to the extract recycle column while the scrubbed reaffinate may be treated further according to conventional practice to recover specific non-aromatics.

The extract phase, i.e., the solvent loaded with aromatics and dissolved low-boiling non-aromatics, is removed from the bottom of the extractor unit and passes via a heat exchanger 22 and a line 26 to the extract recycle column 4. The hot solvent recycled via line 20 exchanges its heat with the extract in exchanger 22

The extract recycle column is a conventional distillation column. In the recycle column the low-boiling aromatics and part of the benzene in the extract phase are separated and removed as overhead via a line 28. The overhead is condensed in a condenser 30, after which some of it is refluxed back to the top of the recycle column while the remainder is refluxed back to the bottom stage of the extracter unit via a line 32. Condenser 30 (and the other condensers hereinafter mentioned) may be of the air or water-cooled type. The necessary reboil heat for the recycle column is obtained by recycling part of its bottoms product through a heat exchanger 34 where heat is extracted from the overhead product of the ethylbenzene column. The bottoms product of the recycle column, consisting of the aromatics and solvent content of the extract, is delivered via a line 36 to the solvent stripper column 6. The necessary reboil heat for the solvent stripper column is obtained by recycling the bottoms product through two separate heat exchangers 38 and 40 where heat is extracted from the overhead products of the toluene column 10 and the ethylbenzene column 14 respectively.

In the stripper column 6 the aromatics are separated from the solvent, the latter being removed as bottoms-product and recycled back to the extractor unit via line 20. while the former are removed as overhead. The overhead is condensed in a condenser 44, after which some of it is refluxed back to the top of the stripper column while the remainder is delivered via a line 46 and a heat exchanger 48 to the benzene distillation column 8.

In exchanger 48, the aromatics are pre-heated by exchange of heat from the overhead vapors of the ethylbenzene column 14. Benzene is removed as a sidestream product via line 52. The overhead vapors are condensed in a condenser 50. Any water present, is separated in a decanter 53 and rejected. Any low boiling non-aromatics present can be periodically rejected from the hydrocarbon stream which is refluxed back to the benzene column 8.

The necessary reboil heat for the benzene column is achieved by recycling some of the bottoms product through a heat exchanger 54 where it picks up heat from the overhead product of the xylene distillation column 12.

The aromatic bottoms product of the benzene column is delivered via a line 56 to the toluene distillation column 10. The latter is provided with a reboiler 58 which preferably is heated by steam. Alternatively reboiler 58 may be of the type that is fired by oil or gas or heated by electricity. Toluene overhead vapor passes by way of lines 60 and 62 through heat exchanger 38 where it condenses to supply some of the reboil heat for the solvent stripper column. Some of the condensed toluene in line 62 is recycled back to the top of the toluene column via a line 64, while the remainder is delivered to storage or to other process equipment via a line 66.

The bottoms product from the toluene column is fed to the xylene column 12 which is provided with a reboiler 68 that preferably is heated in the same manner as reboiler 58. In the xylene column the feed stream is separated into a bottoms product consisting almost wholly of $C_9$ and heavier aromatic compounds and an overhead product consisting almost wholly of xylenes and ethylbenzene. The $C_9$ aromatics are delivered to storage or other process equipment via a line 70. A portion of the xylene-ethylbenzene overhead vapor is delivered via lines 72 and 74 through heat exchanger 54 where it supplies reboil heat for the benzene column. Line 74 delivers the condensed overhead stream to two lines 76 and 78, the former leading back into the top of the xylene column and the latter serving as a feed conduit for the ethylbenzene column 14. The remaining portion of the overhead from the xylene column is condensed in a condenser 80 and then delivered to lines 76 and 78. Although not shown it is to be understood that suitable valving is provided in lines 76 and 78 so as to control the amount of overhead product which is refluxed to the top of the xylene column and delivered as feed to the ethylbenzene column.

The ethylbenzene column 14 is provided with a reboiler 84 which preferably is heated in the same manner as reboilers 58 and 68. The ethylbenzene column is operated so that the xylenes separate out as bottoms product and the ethylbenzene as overhead product. The xylenes are recovered and delivered to storage or other process equipment by a line 88. Most of the ethylbenzene overhead fraction is delivered to heat exchangers 34, 40 and 48 via a common line 90 and branch lines 92, 94 and 96. A common line 98 connecting with the aforesaid heat exchangers carries the cooled ethylbenzene fraction back to two lines 100 and 102. Line 100 connects back to the top of the ethylbenzene column and serves to provide a reflux path. Line 102 leads to ethylbenzene storage tanks or to other process equipment. That portion of the overhead of column 14 which is not recycled to the heat exchangers 34, 40 and 48 is condensed in a condenser 104 and then delivered to lines 100 and 102. Suitable valving (not shown) is provided to control the amount of ethylbenzene refluxed back to the top of column 14.

As is well known to persons skilled in the art, substantial quantities of heat are required to effectively separate closely boiling aromatic hydrocarbons, particularly when as in the above-described system ethylbenzene is to be separated from xylenes. The foregoing system capitalizes on this fact by utilizing the heat content of the overhead vapors from one or more of the columns in the fractionating system to satisfy the heat requirements of the extract recycle column 4 and the solvent stripper 6 which form part of the extraction system. In this connection it is to be appreciated that the extract recycle column is an optional part of the extracting system and may be omitted. Similarly to extraction system may include more than one extractor unit and more than one extract recycle column or solvent stripper column, as well other auxiliary equipment such as a wash column.

One essential requirement of the invention is that the overhead products of the distillation unit used to supply heat to the extraction system must be at a higher temperature and also must have a higher condensing temperature than the required reboil temperature in the solvent stripper. This is necessary in order to effect the necessary direct heat exchange to reboil the bottoms fluids circulating through heat exchangers 34, 38 and 40. Fortunately many of the solvents commonly employed in aromatics extraction systems permit the extract recycle column and the solvent stripper column to be operated at reboil temperatures substantially lower than the condensing temperatures of the overhead products from the toluene, xylene and ethylbenzene columns. However, in addition to the aforesaid temperature requirements, the overhead vapors from the distillation units must also provide an ample supply of heat energy to satisfy at least a substantial portion of the large heat requirements of the extract recycle, solvent stripper or other columns in the aromatics plant. This additional requirement is readily met since the fractional distillation unit requires a substantial condensation duty due to the high reflux ratios associated with the distillation process, particularly when the fractionation scheme includes, as in the illustrated embodiment, an ethylbenzene/xylene distillation. As a practical matter, if the fractionation scheme includes an ethylbenzene/xylene distillation, it may be unnecessary to recycle the overhead from the toluene and xylene columns as in the illustrated embodiment if the condensation duty of the ethylbenzene is large enough to satisfy the heat requirements of the extraction system and the benzene column. This is particularly true if the fractionation unit is modified to include an additional distillation column to effect separation of o-xylene from m- and p-xylenes. This latter separation requires a high heat input and provides an additional condensation duty which may be utilized to satisfy the heat requirement of the extraction system. On the other hand, if the fractionation unit included only the benzene and toluene columns the condensate duty of the overhead vapors would be insufficient to satisfy the heat requirements of the extraction system. Furthermore, the illustrated recycling of the overhead vapors from the toluene and xylene columns is feasible only if a suitable temperature difference is available to effect the desired heat exchange. It also is to be appreciated that any additional condensation duty required for the overhead vapours of the several distillation units may be carried out in auxiliary condensers or else utilized to provide heat elsewhere in the same plant, e.g., to supply heat to a raffinate fractionation system, or a light hydrocarbon recovery and purification stage, a naphtha prefractionator, or some other by-product chemical system.

As indicated above, with many extraction solvents low reboil temperatures are possible in the extract recycle and solvent stripper columns. For example, where the extraction unit employs N-methylpyrrolidone and water as a solvent in the illustrated embodiment of the invention, it is possible to operate both the extract recycle column and the solvent stripper column at reboil temperatures below 250° F. and at near atmospheric pressure. This relatively low reboil temperature is advantageous since it allows the ethylbenzene distillation to be carried out at essentially atmospheric pressure and still satisfy the temperature and heat requirements of an integrated extraction/distillation system as above described.

Of course, the temperature difference between the condensing temperature of the overhead vapors of the distillation section and the reboil temperatures in the extraction unit may be adjusted for the requirements of each extraction process, i.e., according to the particular extraction solvent or mixture of solvents employed. This temperature difference may be adjusted by varying the operating pressures of the aromatic fractionation towers. By increasing such operating pressures it is possible to get overhead vapors that are at a higher temperature and condense at a higher temperature. Although this approach requires a greater heat input to the fractionation unit, the additional condensation duty which results may be utilized as a source of heat for other equipment. In this connection it is to be appreciated that an aromatics extraction/fractionation system usually is part of a larger plant embodying other process equipment having heat requirements. A second method of adjusting the temperature difference is to operate the extract recycle column and the solvent stripper column at less than atmospheric pressure so that a lower temperature is required to boil off the aromatics. By way of example, either or both of these approaches is required if the solvent comprises a mixture of N-methylpyrrolidone and ethylene glycol since this particular solvent requires higher reboil temperatures than is the case using N-methylpyrrolidone and water.

The following examples specifically demonstrate the advantages of the invention when practiced utilizing the system illustrated in the drawing.

EXAMPLE I

A reformate stream comprising a mixture of benzene, toluene, xylenes, ethylbenzene, $C_9$ and heavier aromatics, and non-aromatic hydrocarbons ranging from 5 to 10 carbon numbers is delivered to extractor unit 2 on a continuous basis. The extraction process used in this example is the Arosolvan process by Lurgi which utilizes a solvent mixture of N-methylpyrrolidone and water. The extract recycle column 4 is operated at atmospheric pressure. The solvent stripper 6 is operated under a partial vacuum to obtain the optimum separation ratio between the solvent and the aromatic extract. Base temperatures for these columns are 230° F. and 212° F. respectively.

The toluene column 10 and the ethylbenzene column 14 are operated at pressures of 20 p.s.i.g. and 7 p.s.i.g. respectively to maintain overhead vapor temperatures of approximately 300° F., thereby providing adequate differential temperature for the direct exchange of heat from the overhead vapors to the bottoms fluids in columns 4 and 6. This exchange takes place in reboilers 34, 38 and 40. A portion of the ethylbenzene column 14 vapor also preheats the benzene column 8 feed from 120° F. to 240° F. in exchanger 18. Any excess vapor from column 14 is condensed in a trim condenser 104.

The benzene column 8 operates under atmospheric pressure with a base temperature of 290° F. The xylenes column is operated under 17 p.s.i.g. pressure to maintain its overhead vapor temperature at 340° F., thereby providing adequate differential temperature for the direct exchange of heat from its vapor to the benzene column bottoms in reboiler 54. Any excess vapor is condensed in the trim condenser 80.

The fractionating columns 8, 10, 12 and 14 are operated at approximate reflux ratios of 2.5, 2.5, 2.0 and 75 respectively. Under these conditions, benzene, toluene, xylene and ethylbenzene products are recovered with purities of at least 95% each.

Table I presents a typical material balance and utility summary for the combined extraction/fractionation system with interchange of heat as practiced in Example I.

EXAMPLE II

In this case the same feedstock is used and the extractor and distillation columns are maintained under the same operating conditions as in Example I. However, the heat necessary for reboiling the columns 4, 6 and 8 and for heating the feed to the benzene column is derived from steam supplied to the heat exchangers 34, 38, 40, 48 and 54 rather than from the condensation duty of the overhead vapors of the toluene, xylene and ethylbenzene columns. In addition, condensation of these overhead vapors is produced by the use of cooling water in conventional condensers. The yield and purity of the recovered aromatics is the same as in Example I.

Table II presents a typical material balance and utility summary for a conventional extraction/fractionation system, i.e., a system according to Example II without interchange of heat between the columns of the fractionating section and the columns of the extraction section.

TABLE I.—COMBINED EXTRACTION/FRACTIONATION SYSTEM

[Material balance (based on 1,000 pounds of total aromatics)]

| | Feed stock composition | Extract composition | Products | | | | |
|---|---|---|---|---|---|---|---|
| | | | Benzene | Toluene | Xylenes | Ethylbenzene | Heavy aromatics |
| Benezene | 200 | 198 | 198 | TR | | | |
| Toluene | 217 | 215 | TR | 215 | | TR | |
| Xylene | 318 | 302 | | TR | 301 | TR | 1 |
| Etnylbenzene | 96 | 90 | | TR | 6 | 84 | |
| Heavy aromatics | 169 | 101 | | | 3 | | 98 |
| Nonaromatics | 940 | NIL | | | | | |
| Total | 1,940 | 906 | 198 | 215 | 310 | 84 | 99 |

Total utilities for combined system

M.P. steam, lb./lb. of extract _____ 0.0331
Fuel oil, lb./lb. of extract _____ 0.1068
Cooling water, gal./lb. of extract _____ 4.5840

TABLE II.—CONVENTIONAL SYSTEM (NO INTEGRATION)

[Material balance—Same as Table I]

Total utilities for conventional system

M.P. steam, lb./lb. of extract_____ 1.2781
Fuel oil, lb./lb. of extract_____ 0.1068
Cooling water, gal./lb. of extract_____ 8.3760

It is believed that the foregoing description and examples clearly illustrate the economic advantages of the integration provided by this invention. In addition to the large savings in utility costs which is estimated to be approximately $900,000 per year for a typical size aromatics complex of 500,000 LTPA of total aromatics, there is a further savings in capital investment since the invention avoids installing separate reboiling and condensing equipment for each unit as required in a conventional unintegrated system.

It is to be appreciated that the invention is not limited to the specific operating conditions (temperatures, pressures, reflux ratios, etc.) recited in Example I and that these conditions may be varied as permitted by specific plant design, and also according to the specific solvent employed in the extraction unit. Thus by way of further example, the fractionating columns 8, 10, 12 and 14 may be operated so that their overhead vapors have a temperature as low as 250° F. and as high as 400° F. Similarly the fractionating columns may be operated at pressures of as much as 3–5 atmospheres. Corresponding variations in the operating conditions of the extract recycle and solvent stripper columns also may be made by persons skilled in the art.

Persons skilled in the art will also appreciate that since the invention involves and is based upon direct heat exchange between the overhead vapors of an aromatics fractionating section and low level heat users in an aromatic complex, it is not limited to the particular system illustrated in the drawing. Thus, for example, it is not necessary that the integrated system be designed to recover ethylbenzene; instead the aromatics fractionating section of the illustrated system may omit the fractionating column 14 and include a stage for recovering o-xylene from a mixture of $C_8$ aromatic isomers which comprises a fractionating column designed to separate o-xylene and an isomerization unit designed to convert the other $C_8$ isomers to o-xylene, with the overhead vapors of the fractionating column serving as the source of heat for the columns of the extractor section. It is to be appreciated also that the invention is applicable to still other types of aromatics systems so long as such systems comprises (a) one or more relatively high level heat users characterized by overhead vapors with a relatively large condensation duty and (b) one or more relatively low level heat users in which the operating temperature is less than the condensing temperature of the overhead vapors. Obviously the high level heat users may consist of fractionating columns for $C_9$ and heavier aromatics as well as for $C_7$ and $C_8$ aromatics.

It is to be understood that the invention is not limited in its application to the details and arrangement of apparatus and method specifically described or illustrated, and that within the scope of the appended claims, it may be practiced otherwise than as specifically described or illustrated.

What is claimed is:

1. An integrated extraction/fractionating system for separating aromatic hydrocarbons from a feedstock comprising a mixture of aromatic and non-aromatic hydrocarbons including xylenes and ethylbenzene, said system comprising an extractor containing a solvent for said aromatic hydrocarbons, means for delivering said feedstock mixture to said extractor, means for removing from said extractor an extract phase comprising said solvent and said aromatics and a raffinate phase rich in non-aromatics, a solvent stripper column adapted to separate said extract phase into a vaporized aromatics extract overhead fraction and a liquid solvent bottoms fraction, a heat exchanger having first and second sides, means for recirculating the liquid at the bottom of said stripper column through the first side of said heat exchanger, means for delivering said extract phase to said solvent stripper column, means for recycling said solvent bottoms fraction from said stripper column to said extractor, a multi-stage fractionating unit adapted to separate said aromatics extract overhead fraction into a plurality of different aromatic hydrocarbon fractions, said multistage fractionating unit comprising a plurality of fractionating columns each adapted to separate the feed thereto into an overhead fraction and a bottom fraction with one of said fractionating columns adapted to provide an overhead vapor fraction rich in ethylbenzene, means for feeding said aromatic extract overhead fraction to the first in line of said fractionating columns, means interconnecting said fractionating columns so that the feed for each column succeeding said first in line column is one of the overhead and bottoms fractions of the preceding column, means for supplying heat from a source exterior of said system to said fractionating columns for vaporizing the feed thereto, and means for circulating the overhead fraction of said one fractionating column through the second side of said heat exchanger whereby the liquid at the bottom of said stripper column is heated by exchange of heat with the overhead fraction of said one fractionating column.

2. An integrated extraction/fractionating system according to claim 1 further including an extract recycle column interposed between said extractor and said stripper column, said recycle column being adapted to separate said extract phase into an overhead fraction and a bottoms fraction, means for feeding said extract phase from said extractor to said recycle column, means for recycling the overhead fraction of said recycle column to said extractor, means for delivering the bottoms fraction of said recycle column to said stripper column, a second heat exchanger having first and second sides, means for recirculating the liquid at the bottom of the recycle column through one side of said second heat exchanger, and means for circulating the overhead fraction of said one fractionating column through the second side of said second heat exchanger to heat the liquid circulating through the first side of said second heat exchanger.

3. In a method of separting aromatic hydrocarbons from a feedstock mixture of ethylbenzene, xylene isomers and other aromatic and non-aromatic hydrocarbons comprising contacting said feedstock with a selected solvent in an extractor to form a raffinate phase rich in non-aromatic hydrocarbons and a liquid aromatics extract phase comprising said solvent and said aromatic hydrocarbons, separating said raffinate and extract phases, passing said extract phase to a solvent stripper column, distilling said extract phase in said stripper column to provide an aromatics extract overhead fraction and a solvent bottom fraction, recycling said solvent fraction to said extractor, passing said aromatics extract overhead fraction through a multi-stage fractional distillation unit, fractionally distilling said aromatic extract overhead fraction in said fractional distillation unit to provide a plurality of discrete vaporized overhead and liquid bottoms fractions, and separately recovering said discrete fractions, the improvement comprising obtaining by said fractional distillation a vaporized overhead fraction rich in ethylbenzene that has a condensing temperature greater than the operating temperature of said solvent stripper column, circulating a portion of the extract phase in the bottom end of said stripper column through one side of a heat exchanger, and circulating said ethylbenzene-rich fraction through another side of said heat exchanger whereby the condensate duty of said one ethylbenzene-rich fraction is utilized to supply heat to distill said extract phase in said stripper column.

4. The method of claim 3 including passing a second portion of the extract phase in the bottom end of said stripper column through one side of a second heat exchanger, and circulating another of the discrete vaporized overhead fractions produced by said distillation unit through another side of said second heat exchanger whereby the condensate duty of said another discrete vaporized overhead fraction also is used to supply heat to distill said extract phase in said stripper column.

5. The method of claim 3 wherein the feedstock also includes benzene and toluene and said aromatics extract is fractionally distilled in said fractional distillation unit into discrete benzene, toluene and ethylbenzene-rich overhead fractions and a xylene rich bottom fraction, and further wherein the toluene-rich overhead fraction and a second portion of the extract phase in the bottom end of said stripper column are circulated through a second heat exchanger so that the condensate duty of said toluene-rich fraction is used to supply heat to distill said extract phase in said stripper column.

6. The method of claim 3 wherein said solvent is one of the following: (a) N-methylpyrrolidone and water, (b) N-methylpyrrolidone and a glycol, (c) a glycol, and (d) a mixture of glycols.

References Cited
UNITED STATES PATENTS

| | | | |
|---|---|---|---|
| 2,052,722 | 9/1936 | Radasch | 203—26 |
| 2,146,679 | 2/1939 | Koenemann et al. | 203—25 |
| 2,272,951 | 2/1942 | Morf et al. | 202—174 |
| 2,286,852 | 6/1942 | Holm | 203—22 |
| 2,959,626 | 11/1960 | Krausse et al. | 260—669 |
| 3,032,481 | 5/1962 | Harding et al. | 203—24 |
| 3,254,024 | 5/1966 | Huckins et al. | 203—25 |
| 3,265,590 | 8/1966 | Redcay | 203—21 |
| 3,367,846 | 2/1968 | Uith et al. | 203—25 |
| 3,414,484 | 12/1968 | Carson et al. | 203—26 |
| 3,477,915 | 11/1969 | Gantt et al. | 202—155 |

FOREIGN PATENTS 479,106   4/1936   Great Britain _____ 203—24

WILBUR L. BASCOMB, JR., Primary Examiner

U.S. Cl. X.R.

23—270.5, 310; 202—169, 174; 203—22, 24, 25, 80; 208—323, 326